United States Patent [19]

Nishimatsu et al.

[11] Patent Number: 4,734,326

[45] Date of Patent: Mar. 29, 1988

[54] MAGNETIC RECORDING MEDIUM

[75] Inventors: Masaharu Nishimatsu, Komoro; Hiroyuki Arioka; Toshiaki Ide, both of Saku, all of Japan

[73] Assignee: TDK Corporation, Tokyo, Japan

[21] Appl. No.: 694,281

[22] Filed: Jan. 24, 1985

[30] Foreign Application Priority Data

Jan. 31, 1984 [JP] Japan ................. 59-14380

[51] Int. Cl.$^4$ ............................ B32B 5/16; G11B 5/78
[52] U.S. Cl. .................................... 428/328; 428/694; 428/900; 427/131
[58] Field of Search ............... 428/694, 328, 698, 900; 427/128, 131

[56] References Cited

U.S. PATENT DOCUMENTS

| 4,135,031 | 1/1979 | Akashi et al. | 428/694 X |
| 4,135,032 | 1/1979 | Akashi et al. | 428/328 |
| 4,146,031 | 3/1979 | Fujiyama et al. | 428/698 X |
| 4,328,935 | 5/1982 | Steel | 428/694 X |
| 4,411,963 | 10/1983 | Aine | 428/694 X |
| 4,612,244 | 9/1986 | Kaneda et al. | 428/694 X |

Primary Examiner—Nancy A. B. Swisher
Attorney, Agent, or Firm—Oblon, Fisher, Spivak, McClelland & Maier

[57] ABSTRACT

A magnetic recording medium comprising a non-magnetic substrate, a magnetic recording layer formed on one side of the substrate and a back coating layer formed on the other side of the substrate, characterized in that the back coating layer is a coating layer comprising zinc sulfide and a resin binder.

3 Claims, 2 Drawing Figures

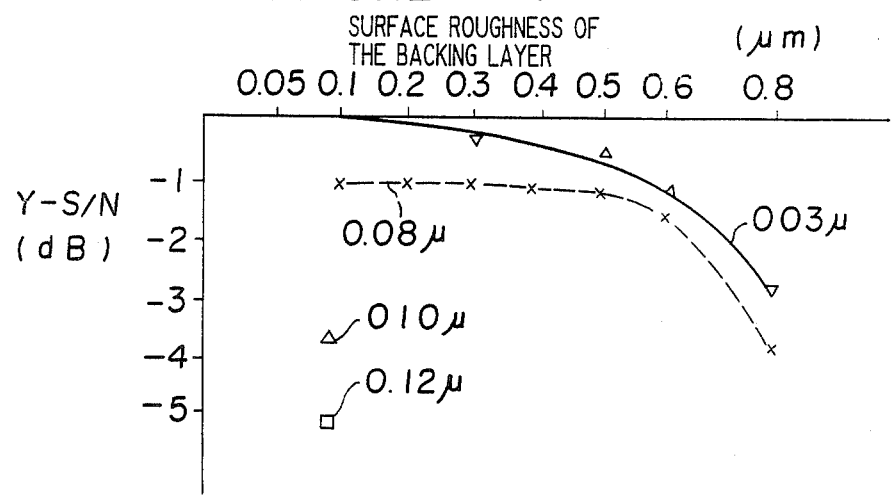
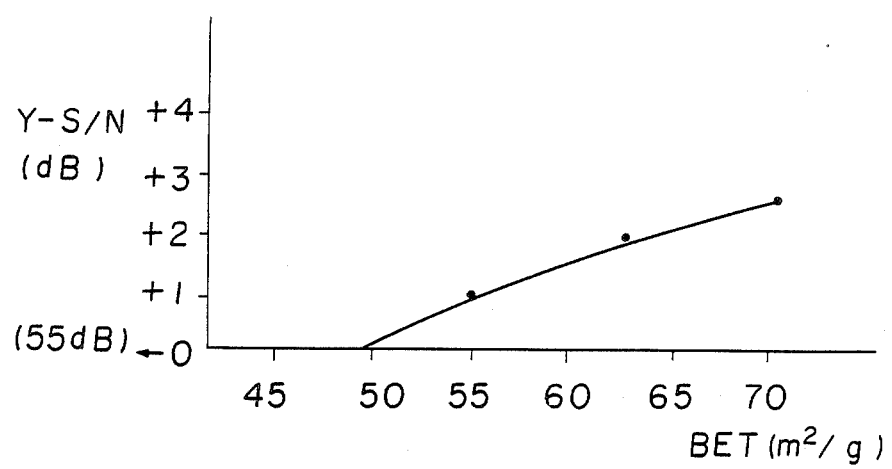

MAGNETIC RECORDING MEDIUM

The present invention relates to a magnetic recording medium having excellent electromagnetic conversion characteristics, running durability and a good winding appearance with minimum abrasion of the back coating layer. More particularly, the present invention relates to a magnetic recording medium having a feature in the composition of the coating layer (i.e. the back coating layer) formed on the resin side of the substrate opposite to the side on which a magnetic recording layer is provided.

Recently, magnetic recording media have been widely used in the fields of audio and video recording, computers, magnetic discs, etc. Accordingly, the amount of information to be recorded on magnetic recording media increases year after year, and there is an increasing demand for the improvement of the recording density of magnetic recording media.

As one of the conditions required for a magnetic recording medium for high density recording, it has been suggested to improve the coercive force and to make the medium thinner both from the theoretical and experimental points of view. There have been various proposals with respect to the compositions of the binder (binding agent), inorganic filler or lubricant for the back coating layer (e.g. Japanese Examined Patent Publication No. 29769/1982). However, there have been various problems with respect to the running durability (the winding appearance, the abrasion of the back coating layer, or the susceptibility of the back coating layer to scars due to abrupt stopping of the running tape), the adhesion of the back coating layer or calender stains during the process for the preparation (dropouts caused by the abrasion of the back coating layer or the calender stains). Further, none of them is fully satisfactory with respect to the electromagnetic conversion characteristics.

In a recording system presently available in which a magnetic head is employed, a spacing loss between the tape and the head is represented by $54.6\, d/\lambda\,[\mathrm{dB}]$ where d is a distance between the tape and the head, and $\lambda$ is a recording wavelength. As is evident from this formula, in a short wave recording system having a high recording density which has been highly in demand recent years for the reason of e.g. abundant information to be recorded, the rate of the decrease in the output attributable to the spacing is extremely great as compared with the long wave recording system. Accordingly, even a fine foreign matter deposited on the tape surface is likely to lead to a failure to detect a pulse which should be detected at the time of reading out the information written in the magnetic recording medium and thus is likely to be detected as a dropout. As the causes for the foreign matters attributable to the dropouts, there may be mentioned magnetic powder fallen off from the magnetic layer of the magnetic recording tape as a result of a deterioration of the magnetic layer due to the repeated exertion of stress, or particles abraded off from the substrate during the tape running or dusts which are electrostatically deposited on the substrate surface and then transferred to the magnetic layer surface. In order to prevent the deposition of foreign matters, there have been proposed a method wherein a coating composition prepared by kneading an inorganic filler such as carbon black or graphite with an organic binder, is coated on the rear side of the substrate opposite to the magnetic layer side of the magnetic recording tape, to provide an antistatic property, or a method wherein the abrasion of the substrate is minimized by making the substrate tough. Further, in the case where the magnetic layer is made of a thin metal film, the magnetic recording medium tends to curl since the magnetic layer is thin. The backing layer plays an important role also for the prevention of such curling. By these treatments, the tendency for the increase of the dropouts by the repeated running operation can substantially be controlled. However, the level of the control is not yet adequate, and the dropouts are required to be further reduced.

The present inventors have conducted extensive researches on the composition of the back coating layer with an aim to solve the above-mentioned difficulties, and have found that it is possible to obtain a magnetic recording medium having excellent properties, i.e. low friction, good running properties with minimum abrasion, free from calender stains during the process for the preparation and with the back coating layer being tough without a deterioration of the surface roughness, by using zinc sulfide and a resin binder for the back coating layer.

Namely, the present invention provides a magnetic recording medium comprising a non-magnetic substrate, a magnetic recording layer formed on one side of the substrate and a back coating layer formed on the other side of the substrate, characterized in that the back coating layer is a coating layer comprising zinc sulfide and a resin binder.

Now, the present invention will be described in detail with reference to the preferred embodiments.

In the accompanying drawings,

FIG. 1 is a graph illustrating the relation between the surface roughness of the magnetic layer and the back coating layer of a magnetic recording medium and the S/N ratio.

FIG. 2 is a graph illustrating the relation between the BET specific surface area of an alloy magnetic powder and the S/N ratio.

Zinc sulfide is white amorphous powder or crystals, and it is commonly employed as a white pigment, particularly in combination with barium sulfate, for e.g. paints, oil cloth, linoleum or elastomers, or as a phosphor.

On the other hand, it has been common to use, as an inorganic pigment for a back coating layer of a magnetic recording medium, tungsten disulfide, molybdenum disulfide, boron nitride, $SiO_2$, $CaCO_3$, $Al_2O_3$, $Fe_2O_3$, $TiO_2$, MnO, CaO, $SnO_2$, graphite, asbestos, mica or the like. It has been common to use such an inorganic pigment having a particle size within a range of from 0.02 to 10 $\mu$m.

Whereas, the present inventors have found that by using zinc sulfide as an inorganic pigment for the back coating layer of a magnetic recording medium, it is possible not only to improve the toughness of the back coating layer but also to provide a magnetic recording medium having excellent electromagnetic conversion characteristics in addition to superior properties such that the friction is substantially reduced to provide excellent running properties, the winding appearance is good, and the abrasion is minimum. The present invention has been accomplished based on this discovery.

Zinc sulfide may be prepared e.g. by adding ammonium sulfide to a zinc salt solution, or by introducing hydrogen sulfide to a zinc salt solution acidified with acetic acid. In the present invention, it is possible to employ zinc sulfide prepared by any method. The particle size should preferably be at most 0.5 μm, more preferably at most 0.2 μm from the viewpoints of the electromagnetic conversion characteristics and the surface property.

As the resin binder to be used for the back coating layer of the present invention, there may be employed thermoplastic resins, thermosetting resins or reactive resins, or mixtures thereof, which are commonly used for the magnetic recording media. However, from the viewpoint of the strength of the formed coating layer, a thermosetting type resin is preferred.

As the thermoplastic resins, there may be employed those having a softening point of at most 150° C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diaceate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Particularly preferred is a thermosetting resin which is a combination of a cellulose resin (e.g. nitrocellulose), a vinyl chloride-vinyl acetate-vinyl alcohol copolymer and urethane (wherein a curing agent is used), or a radiation curable resin which is composed of a vinyl chloride-vinyl acetate-vinyl alcohol coplymer (including the one containing a carboxylic acid) or an acryl-modified vinyl chloride-vinyl acetate-vinyl alcohol copolymer (including the one containing a carboxylic acid) and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture. Particularly preferred is a combination comprising:

(A) a plastic compound having a molecular weight of from 5,000 to 100,000 and containing at least two radiation-curable unsaturated double bonds;

(B) a rubber-like compound having a molecular weight of from 3,000 to 100,000 and containing at least one radiation-curable unsaturated double bond or containing no such double bond; and (C) a compound having a molecular weight of from 200 to 3,000 and containing at least one radiation-curable unsaturated double bond, in the proportions of from 20 to 70% by weight of the compound (A), from 20 to 80% by weight of the compound (B) and from 10 to 40% by weight of the compound (C). It is advantageous to use a radiation curable resin, since the curing time is short and there will be no transfer of e.g. fillers from the back coating surface to the magnetic layer after the winding up operation. Whereas, in the case of thermosetting resin, there will be a problem that the electromagnetic conversion characteristics differ as between the inner side and the outer side of the jumbo roll during the course of the thermosetting due to the transfer of the rear side pattern of the back coating surface caused by the tightening of the winding of the jumbo roll at the time of the thermosetting.

The curing agent to be used in the present invention may be any curing agent which is commonly used for thermosetting resins of this type. Particularly preferred is an isocyanate-type curing agent. For instance, there may be mentioned Kryspon 4565 and 4560 manufactured by Dai-Nippon Ink & Chemicals Co., Colonate L manufactured by Nippon Polyurethane Industry Co. and Takenate XL-1007 manufactured by Takeda Chemical Industries, Ltd.

In the present invention, zinc sulfide and the resin binder are used normally in a ratio of from 30 to 300 parts by weight of zinc sulfide relative to 100 parts by weight of the resin binder. If the amount of the binder is excessive, blocking will be led. On the other hand, if the amount of the binder is too small, deposition is likely to be led during the calender treatment, such being undesirable.

Other additives such as lubricants, dispersing agents or antistatic agents may also be incorporated in the back coating layer of the present invention in a usual manner. It has been found that if no lubricant is incorporated, the back coating layer will have a high frictional coefficient, whereby flickering of the image or jitters are likely to be brought about. Further, since the frictional coefficient is especially high under a high temperature running condition, abrasion of the back coating layer is likely to be led, and the tape winding tends to be irregular. Whereas, the back coating layer containing zinc sulfide has a low frictional coefficient, whereby the tape winding will be smooth and free from irregularities, and a stabilized image will be obtained from the initial stage and even after repeated running operations. As the lubricant, there may be employed e.g. silicone oil, fluorine oil, a fatty acid, a fatty acid ester, a paraffin, a liquid paraffin or a surfactant as a lubricant which has been commonly used for the back coating layer of this type. However, it is particularly preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total of from 21 to 23 as added with the number of carbon atoms of the fatty acid.

As the dispersing agent, there may be employed an organic titanium coupling agent, a silane coupling agent or a surfactant. As the antistatic agent, various surfactants may be employed. Further, usual additives such as carbon black may also be incorporated.

The amounts of the above-mentioned additives may be from 15 to 50 parts by weight of a curing agent, from 1 to 10 parts by weight of a lubricant and from 1 to 10 parts by weight of an antistatic agent such as a dispersing agent or surfactant, relative to 100 parts by weight of the binder.

The thickness of the back coating layer of the present invention is usually within a range of from 0.3 to 10 $\mu$m after being coated and dried.

According to the present invention, a coating layer comprising zinc sulfide and a resin binder is employed as the back coating layer, as mentioned above, whereby it is possible to obtain a magnetic recording medium which has good running properties with low friction and which is free from abrasion of the back coating. Further, the surface roughness of the back coating layer is good and, when cut into a tape, tightening of the tape winding is reduced, whereby the transfer of the roughness of the back coating surface to the magnetic layer is minimized. Accordingly the electromagnetic conversion characteristics will be improved, the adhesion to the magnetic layer and cinching phenomenon can be reduced, the S/N ratio can be maintained at a satisfactory level, and it is possible to obtain a magnetic recording medium having a tough back coating layer. The surface roughness of the back coating layer is preferably from 0.05 to 0.6 $\mu$m.

In the present invention, it is further preferred, for the reduction of dropouts, to incorporate carbon black into the back coating layer, whereby dropouts can be minimized by virtue of the antistatic function of the carbon black.

As the carbon black to be used for the back coating layer of the present invention, there may be employed any carbon black produced by any one of conventional methods, such as furnace, channel, acetylene, thermal or lamp. However, acetylene black, furnace black, channel black, roller and disc black and German naphthalene black are preferred. The particle size of the carbon black to be used in the present invention is not critical, but is preferably from 10 to less than 100 m$\mu$m, more preferably from 20 to 80 m$\mu$m, as measured by an electron microscopic photography. If the particle size is 100 m$\mu$m or greater, the antistatic effect of the back coating layer tends to be poor, the roughness of the back coating layer surface tends to be great and thus is likely to roughen the magnetic layer when the magnetic recording medium is wound up as a magnetic tape, or the electromagnetic conversion characteristics tend to be inferior. The Young's modulus of elasticity of the back coating layer is adequately high when the particle size is less than 100 m$\mu$m. However, when the particle size exceeds 100 m$\mu$m, the Young's modulus of elasticity tends to decrease, and the adhesion of the back coating layer tends to decrease as well. On the other hand, if the particle size is less than 10 m$\mu$m, the dispersion of the particles in the coating material for the back coating layer tends to be non-uniform, whereby a uniform dispersion is not obtainable, thus leading to a decrease of the Young's modulus of elasticity. Further, because of the non-uniformity, it is impossible to adequately reduce the electrostatic property of the back coating layer.

The ratio of zinc sulfide to carbon black is preferably ZnS/C=9/1-1/9, and from the viewpoint of the toughness of the coating layer is more preferably ZnS/C=7/3-3/7.

As the magnetic layer of the present invention, there may be employed a coating type composed of a coating layer comprising fine ferromagnetic particles and a binder, or a thin metal film type composed of a thin layer of ferromagnetic metal. As the ferromagnetic material, there may be mentioned $\gamma$-Fe$_2$O$_3$, Fe$_3$O$_4$, Co-doped $\gamma$-Fe$_2$O$_3$, Co-doped $\gamma$-Fe$_2$O$_3$-Fe$_3$O$_4$ solid solution, Co compound-adsorbed $\gamma$-Fe$_2$O$_3$, Co compound-adsorbed Fe$_3$O$_4$ inclusive of an intermediately oxidized state with $\gamma$-Fe$_2$O$_3$ (the Co compound here is meant for e.g. cobalt oxide, cobalt hydroxide, cobalt ferrite or cobalt ion-adsorbed substance, whereby the magnetic anisotropy of cobalt is utilized for the improvement of the coercive force), or iron, cobalt, nickel, other ferromagnetic metal or a magnetic alloy such as Fe—Co, Fe—Ni, Co—Ni, Fe—Rh, Fe—Cu, Fe—Au, Co—Cu, Co—Au, Co—Y, Co—La, Co—Pr, Co—Gd, Co—Sm, Co—Pt, Ni—Cu, Fe—Co—Nd, Mn—Bi, Mn—Sb or Mn—Al. Further, a ferrite magnetic substance such as Ba ferrite or Sr ferrite may be mentioned.

Heretofore, there have been commonly used as the ferromagnetic powder, for instance, $\gamma$-Fe$_2$O$_3$, Co-containing $\gamma$-Fe$_2$O$_3$, Fe$_3$O$_4$, Co-containing Fe$_3$O$_4$ or CrO$_2$. However, the magnetic characteristics such as the coercive force and the maximum residual magnetic flux density of these ferromagnetic powders, are inadequate for high sensitivity high density recording, and they are not suitable for use for magnetic recording of a signal having a short recording wavelength of a level of at most about 1 $\mu$m or for the magnetic recording with a narrow track width.

As the requirements for the magnetic recording media have become severe, there have been developments in or proposals for ferromagnetic powders having characteristics suitable for high density recording. Such ferromagnetic powders include metals or alloys such as Fe, Co, Fe—Co, Fe—Co—Ni or Co—Ni, and alloys thereof with Al, Cr or Si. For the purpose of high density recording, the magnetic recording layer using such an alloy powder is required to have a high coercive force and a high residual magnetic flux density. Therefore, it is desirable that various methods for the production or alloy compositions are selected to meet these requirements.

The present inventors have prepared magnetic recording media by employing various alloy powders, and have found that a magnetic recoridng medium with a noise level being sufficiently low and suitable for high density short wave recording is obtainable when the specific surface area as measured by BET method is at least 48 m$^2$/g, the coercive force of the magnetic layer is at least 1000 Oe, and the surface roughness of the magnetic layer is at most 0.08 μm as a R$_{20}$ value (an average value of 20 values) with a cut off of 0.17 mm by Talystep method. When such a magnetic layer is combined with the back coating layer of the present invention, the cinching phenomenon (the loosening of the tape winding when the tape has been stopped abruptly), dropouts and friction can be reduced. Further, there is a trend that as the base for the magnetic tape, a plastic film made of e.g. polyethylene terephthalate, polyethylene naphthalate, polyimide or polyamide has a thickness as thin as about 11 μm or less, and accordingly there is an increasing tendency for greater tightening of the tape winding, thus leading to the transfer of the surface roughness of the back coating surface to the magnetic layer and the consequential decrease in the output. Such drawbacks are also overcome by the above-mentioned combination of the magnetic recording layer and the back coating layer according to the present invention. Further, when a ferromagnetic metal is used as the major component of the ferromagnetic material, it is likely that the electric resistance of the layer is high, and dropouts are likely to result, and accordingly it is necessary to take a certain antistatic measure. However, such a problem can be solved also by the combination with the back coating layer of the present invention.

The preferred range of the coercive force of the above-mentioned magnetic recording layer is from 1,000 to 2,000 Oe. If the coercive force exceeds this range, the magnetic head tends to be saturated at the time of recording, or it becomes difficult to erase the magnetization. In general, the greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, the surface roughness of the magnetic recording layer affects the recording sensitivity. If the surface roughness is small, the recording sensitivity for a short wavelength will increase.

As a ferromagnetic alloy satisfying the above characteristics, there may be employed a fine powder of Co, Fe—Co, Fe—Co—Ni or Co—Ni, or such a fine powder mixed with Cr, Al or Si. It may be a fine powder obtained by wet-reducing a metal salt with a reducing agent such as BH$_4$, a fine powder obtained by coating the surface of iron oxide with a Si compound and dry-reducing the product in H$_2$ gas, or a fine powder obtained by evaporating an alloy in a low pressure argon atmosphere, and it has an axial ratio of from 1:5 to 1:10 and a residual magnetic flux density Br of from 2,000 to 3,000 gauss, and satifies the above-mentioned conditions for the coercive force and the specific surface area.

Various binders may be employed in combination with the alloy magnetic powder to prepare magnetic coating compositions. It is usually preferred to employ a thermosetting resin binder or a radiation curable binder. As other additives, there may be employed a dispersant, a lubricant or an antistatic agent in accordance with the conventional method. Since there is a problem in the dispersibility because of the employment of the magnetic powder having a BET specific surface area of at least 48 m$^2$/g, it is advisable to employ a surfactant, an organic titanium coupling agent or a silane coupling agent as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is then coated on a substrate such as a polyester base film and then subjected to thermosetting or radiation curing to form a magnetic layer, and further to calender treatment.

In a case where a radiation curable binder is used for both the magnetic layer and the back coating layer, a continuous curing is possible, and no transfer of the roughness of the rear side to the magnetic layer is likely to take place, whereby dropouts can be prevented. Besides, the radiation curing can be conducted on-line, thus serving for the energy saving the manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape. When the base thickness is as thin as 11 μm or less and the surface hardness of the magnetic layer is small as the hardness of the magnetic metal powder is smaller than the magnetic oxide such as γ-Fe$_2$O$_3$, the magnetic recording medium is susceptible to the influence of the tightening of the tape winding. However, by means of the radiation-cured back coating layer, this adverse effect can be eliminated, and the output difference as between the outside and the inside of the wound tape, or the difference in the dropouts can be eliminated. Thus, it is particularly preferred to employ a radiation curable binder for the back coating layer.

In addition to the above combination, a combination of the back coating layer of the present invention with a thin ferromagnetic metal film as the magnetic recording layer provides excellent electromagnetic conversion characteristics and good surface roughness and serves to prevent curling and minimize the dropouts.

The magnetic recording medium of the present invention can be used in a wide range of various fields such as audio tapes, video tapes, computers and magnetic discs.

Now, the present invention will be described in further detail with reference to Examples. However, it should be understood that the present invention is by no means restricted by these specific Examples.

In the following Examples, different kinds of magnetic layers and back coating layers were formed. Magnetic tapes were prepared with various combinations of such magnetic and back coating layers and examined for the effects of the present invention.

EXAMPLE 1

Formation of magnetic layers (metal oxide type)
Magnetic layer 1 (thermosetting-type magnetic layer)

|  | Parts by weight |
| --- | --- |
| Cobalt-adsorbed acicular $\gamma$-$Fe_2O_3$ (long axis: 0.4 $\mu$m, short axis: 0.05 $\mu$m, Hc: 600 Oe) | 120 |
| Carbon black (antistatic Mitsubishi Carbon Black MA-600) | 5 |
| $\alpha$-$Al_2O_3$ powder (particle size: 0.5 $\mu$m) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following mixture was thoroughly mixed and dissolved.

|  | Parts by weight |
| --- | --- |
| Vinyl chloride-vinyl acetate copolymer (VAGH, manufactured by Union Carbide Co.) | 15 |
| Thermoplastic urethane resin (Nippolan 3022, manufactured by Nippon Polyurethane Industry Co.) | 15 |
| Solvent (MEK/toluene: 50/50) | 200 |
| Lubricant (higher fatty acid-modified silicone oil) | 3 |

The mixture thus obtained was introduced into the ball mill where the magnetic powder was treated, and the mixture was dispersed again for 42 hours. After the dispersing, 5 parts by weight (as solid content) of an isocyanate compound (Desmodule L, manufactured by Bayer AG) reactive and cross linkable with functional groups composed mainly of hydroxyl groups of the binder in the magnetic coating material, was mixed with the above coating material in the ball mill for 20 minutes.

The magnetic coating material thus prepared was applied onto a polyester film having a thickness of 15 $\mu$m, oriented parmanent magnet (1600 gauss), and the solvent was evaporated by means of an infrared lamp or hot air. Then, the coated film was subjected to surface smoothing treatment, and then kept in a rolled state in an oven maintained at 80° C. to promote the cross linking reaction by the isocyanate.

Magnetic layer 2 (radiation curable magnetic layer)

|  | Parts by weight |
| --- | --- |
| Cobalt-adsorbed acicular $\gamma$-$Fe_2O_3$ (long axis: 0.4 $\mu$m, short axis: 0.05 $\mu$m, Hc: 600 Oe) | 120 |
| Carbon black | 5 |
| (antistatic Mitsubishi Carbon Black MA-600) | |
| $\alpha$-$Al_2O_3$ powder (particle size: 0.5 $\mu$m) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following binder composition was thoroughly mixed and dissolved.

|  | Parts by weight |
| --- | --- |
| Acrylic double bond-introduced saturated polyester resin | 10 (as solid content) |
| Acrylic double bond-introduced vinyl chloride-vinyl acetate copolymer | 10 (as solid content) |
| Acrylic double bond-introduced polyether urethane elastomer | 10 (as solid content) |
| Solvent (MEK/toluene: 50/50) | 200 |
| Lubricant (higher fatty acid-modified silicone oil) | 3 |

The binder mixture was introduced into the ball mill wherein the magnetic powder was previously treated, and the mixture was again mixed and dispersed for 42 hours.

The magnetic coating material thus obtained was applied onto a polyester film having a thickness of 15 $\mu$m, and oriented on a parmanent magnet (1600 gauss). After evaporating the solvent by means of an infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

Formation of back coating layers
Back coating layer 1 (thermosetting type)

|  | Parts by weight |
| --- | --- |
| Zinc sulfide, 100 m$\mu$m | 200 |
| Curing agent: Colonate L | 20 |
| Lubricant: | |
| Stearic acid | 4 |
| Butyl stearate | 2 |
| Nitrocellulose: | 40 |
| Vinyl chloride-vinyl acetate-vinyl alcohol copolymer (S-lec A manufactured by Sekisui Plastics Co., Ltd.) | 30 |
| Polyurethane elastomer (Essen 5703) manufactured by B. F. Goodrich Co.) | 30 |
| Solvent mixture (MIBK/toluene) | 250 |

Back coating layer 2 (radiation curable type)

|  | Parts by weight |
| --- | --- |
| Zinc sulfide, various particle sizes | 100 |
| Acryl-modified vinyl chloride-vinyl acetate-vinyl alcohol copolymer (Prepared by the following method (a)) having a molecular weight of 30,000. | 40 |
| Acryl-modified polyurethane elastomer (Prepared by the following method (b)) having a molecular weight of 20,000. | 40 |
| Polyfunctional acrylate having a | 20 |

-continued

|  | Parts by weight |
|---|---|
| molecular weight of 1,000 | |
| Oleic acid | 4 |
| Solvent mixture (MIBK/toluene) | 250 |

The methods for the preparation of the radiation sensitive binders in the above mixture will be described as follows:

(a) Synthesis of an acryl-modified product of a vinyl chloride-vinyl acetate-vinyl alcohol copolymer:

750 Parts by weight of S-lec A, 1250 parts by weight of toluene, and 500 parts by weight of cyclohexanone were charged into a four-necked flask of a 5-liter capacity and dissolved under heating. After raising the temperature to 80° C., 6.14 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen ($N_2$) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI):

348 Parts by weight of tolylene diisocyanate was heated to a temperature of 80° C. in a four-necked flask of one-liter capacity in a nitrogen ($N_2$) stream. Thereafter, 260 parts by weight of 2-hydroxyethyl methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a urethane elastomer:

250 Parts by weight of an isocyanate-terminated diphenylmethane diisocyanate (MDI) type urethane prepolymer, "Nipporan 3119", manufactured by Nippon Polyurethane Industry Co., 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

Each of these two back coating layers was applied, respectively, to the side of the substrate opposite to the side on which the magnetic recording layer was previously formed, so that the dried thickness would be 1.0 $\mu$m, then dried and subjected to calender treatment for smoothing the surface. Then, thermosetting was conducted or electron beams were irradiated on the back coating layer by means of an electron curtain type electron beam accelerator at an acceleration voltage of 150 KeV, at an electrode current of 10 mA and at an absorption dosage of 3 Mrad in a nitrogen atmosphere to cure the back coating layer.

Various characteristics of the magnetic tapes obtained from various combinations of the above magnetic layers and back coating layers are shown in Table 1. The zinc sulfide used for the back coating layer 2 had a particle size of 15 m$\mu$m.

TABLE 1

|  | Sample No. | | | |
|---|---|---|---|---|
|  | 1<br>Magnetic layer 1<br>Back coating layer 1 | 2<br>Magnetic layer 1<br>Back coating layer 2 | 3<br>Magnetic layer 2<br>Back coating layer 1 | 4<br>Magnetic layer 2<br>Back coating layer 2 |
| Abrasion of the back coating layer | ⊚ | ⊚ | ⊚ | ⊚ |
| Surface roughness of the back coating layer $\mu$m | 0.07 | 0.06 | 0.07 | 0.06 |
| Electromagnetic conversion characteristics<br>C-S/N dB | +0 | +0.1 | +0.2 | +0.4 |
| Runs at 40° C. under RH of 80% | | | | |
| Winding appearance | Excellent | Excellent | Excellent | Excellent |
| Image flickering | None | None | None | None |
| Adhesion to the guide poles | None | None | None | None |
| Initial friction . . . Friction after 100 runs | 0.20  0.19 | 0.20  0.19 | 0.20  0.19 | 0.20  0.18 |
| Scars formed on the back coating surface by abrupt stopping | ⊚ | ⊚ | ⊚ | ⊚ |
| Abrasion of the back coating layer at 20° C. at RH of 60% | ⊚ | ⊚ | ⊚ | ⊚ |
| After storage at 60° C. at RH of 80% for 5 days | | | | |
| Winding appearance | Excellent | Excellent | Excellent | Excellent |
| Image flickering | None | None | None | None |
| Friction | 0.20 | 0.20 | 0.20 | 0.19 |

From Table 1, it is evident that as compared with Sample No. 1 wherein both the magnetic layer and the back coating layer were made of thermosetting type resins, Sample Nos. 2 and 3 where one of the layers is made of a radiation curable type resin, have better electromagnetic conversion characteristics, and it is most advantageous that both sides are made of radiation curable type resins (Sample No. 4).

Now, with respect to the magnetic tape prepared by the combination of the above magnetic layer 2 and back coating layer 2, the changes of various characteristics due to the changes in the particle size of the zinc sulfide are shown in Table 2. As Comparative Examples, there have been employed samples wherein MgO (0.5 $\mu$m) and ZnO (0.2 $\mu$m) were used, respectively, instead of the zinc sulfide for the back coating layer.

From Table 2, it is evident that when ZnS is employed, the surface roughness of the back coating layer is superior to the cases where MgO or ZnO was used, whereby there is no deterioration of the electromagnetic properties, and the abrasion of the back coating layer is minimum. The friction is low from the beginning, and remains to be low after the running operations. Accordingly, the winding appearance of the tape is good, and no image flickering is observed. When the particle size exceeds 0.5 μm, the electromagnetic characteristics tend to deteriorate. Particularly preferred is a particle size of at most 0.3 μm.

TABLE 2

| | Average particle size (μm) | | | | | | |
|---|---|---|---|---|---|---|---|
| | of ZnS | | | | | MgO | ZnO |
| Tested items | 0.01 | 0.05 | 0.3 | 0.5 | 0.7 | 0.5 | 0.2 |
| Surface roughness of the back coating layer (μm) | 0.06 | 0.06 | 0.07 | 0.09 | 0.12 | 0.12 | 0.12 |
| Electromagnetic conversion characteristice C-S/N dB | +0.3 | +0.3 | +0.15 | +0 | −0.5 | −0.5 | −0.5 |
| Running test at 40° C. at RH of 80% | ◎ | ◎ | ◎ | ◎ | ○ | △ | △ |
| abrasion of the back coating layer | | | | | | | |
| Winding appearance (after 100 runs) | Excellent | Excellent | Excellent | Excellent | Good | Poor | Good |
| Image flickering | None | none | None | None | None | None-Slight | None-Slight |
| Adhesion to guide poles after 100 runs | None | None | None | None | None | Slight adhesion | Slight adhesion |
| Friction | | | | | | | |
| Initial | 0.20 | 0.20 | 0.20 | 0.20 | 0.20 | 0.35 | 0.20 |
| After 100 runs | 0.18 | 0.18 | 0.18 | 0.18 | 0.18 | 0.42 | 0.30 |
| Scars formed on the back coating surface by abrupt stopping | ◎ | ◎ | ◎ | ◎ | ◎ | △ | ◎ |
| Abrasion of the back coating layer at 20° C. at RH of 60% | ◎ | ◎ | ◎ | ◎ | ◎ | △ | △ |
| After storage at 60° C. at RH of 80% for 5 days | | | | | | | |
| Winding appearance | Excellent | Excellent | Excellent | Excellent | Excellent | Poor | Good |
| Image flickering | None | None | None | None | None | Fair | Slight |
| Friction | 0.20 | 0.20 | 0.20 | 0.20 | 0.22 | 0.40 | 0.25 |

EXAMPLE 2

Different alloy magnetic layers were formed in the following manner, and magnetic recording media were prepared by combining them with the back coating layers of Example 1 and examined for the effects of the present invention.

Formation of magnetic layers

Various alloy powders were prepared by a wet-reduction method. These powders were composed of acicular particles having an axial ratio (short axis/long axis) of from 1/5 to 1/10 and had a residual magnetic flux density of from 2,000 to 3,000 gauss, a coercive force of from 1,000 to 2,000 Oe and a specific surface area of from 45 to 70 m²/g as measured by BET method. These magnetic powders were mixed in the following proportions in a usual manner to obtain the respective magnetic layers.

Magnetic layer 3 (Thermosetting type)

| | Parts by weight |
|---|---|
| Fe—Co—Ni alloy powder (Hc = 1200 Oe, long axis: 0.4 μm, short axis: 0.05 μm, BET specific surface area: 52 m²/g) | 100 |
| Vinyl chloride-vinyl acetate-vinyl alcohol copolymer (VAGH manufactured by UCC, U.S.A.) | 15 |
| polyurethane prepolymer (Desmocol 22 manufactured by Bayer AG) | 10 |
| Methyl ethyl ketone/toluene (1/1) | 250 |
| Myristic acid | 2 |

| | Parts by weight |
|---|---|
| Sorbitan stearate | 2 |

To this mixture, 30 parts by weight of polyisocyanate (Desmodule L manufactured by Bayer AG) was added to obtain a magnetic coating composition. The magnetic coating composition was applied onto a polyester film in a thickness of 3.5 μm and then subjected to calender treatment.

Magnetic layer 4 (Radiation curable type)

The same magnetic alloy powder and base as used for the magnetic layer 3 were employed. The following mixture was applied onto a polyester film in a thickness of 3.5 μm and subjected to electron beam curing and calender treatment.

| | Parts by weight |
|---|---|
| Fe—Co—Ni alloy powder | 100 |
| Vinyl chloride-vinyl acetate-vinyl alcohol copolymer (VAGH manufactured by UCC, U.S.A.) | 15 |
| Polyvinyl butyral resin | 10 |
| Acrylic double bond-introduced urethane | 10 |
| Methyl ethyl ketone/toluene (50/50) | 250 |

These magnetic layers 3 and 4 were combined with the back coating layers 1 and 2 to obtain magnetic recording media. The characteristics of the magnetic recording media are shown in Table 3. For the back coating layer 2, zinc sulfide (20 mμm) was used. As Comparative Examples, back coating layers wherein MgO and ZnO are used, respectively, as the pigment for the back coating layer 2, were employed. However, in this Example, calender treatment was conducted following the formation of each layer.

In the Table, (1) and (2) represent the order for the formation of the respective layers.

TABLE 3

| | Present Invention | | | | Comparative Examples | |
|---|---|---|---|---|---|---|
| | Magnetic layer 3 Back coating layer 1 | (2) Magnetic layer 3 (1) Back coating layer 2 | (1) Magnetic layer 3 (2) Back coating layer 2 | Magnetic layer 4 Back coating layer 2 | Magnetic layer 4 MgO | Magnetic layer 4 ZnO |
| Abrasion of the back coating layer | ◎ | ◎ | ◎ | ◎ | ◎ | ◎ |
| Surface roughness of the back coating layer μm | 0.06 | 0.06 | 0.06 | 0.06 | 0.12 | 0.12 |
| Runs at 40° C. under RH of 80% | | | | | | |
| Winding appearance | Excellent | Excellent | Excellent | Excellent | Poor | Poor |
| Image flickering | None | None | None | None | Slight | Slight |
| Adhesion to the guide poles | None | None | None | None | Slight | Slight |
| Friction | | | | | | |
| Initial | 0.25 | 0.22 | 0.22 | 0.20 | 0.36 | 0.25 |
| After runs | 0.24 | 0.21 | 0.21 | 0.20 | 0.45 | 0.32 |
| Scars formed on the back coating surface by abrupt stopping | ◎ | ◎ | ◎ | ◎ | Δ | Δ |
| Electromagnetic conversion characteristics C-S/N dB | | | | | | |
| Outside | +0.3 | +0.5 | +0.3 | +0.5 | −1.5 | −2.0 |
| Inside | −1.0 | +0.3 | −0.1 | +0.5 | −2.0 | −2.0 |
| After storage at 60° C. at RH of 80% for 5 days | | | | | | |
| Winding appearance | Excellent | Excellent | Excellent | Excellent | No good | Poor |
| Image flickering | Excellent | Excellent | Excellent | Excellent | Substantial | Fair |
| Friction | 0.30 | 0.30 | 0.29 | 0.29 | Stop | 0.36 |

From Table 3, it is evident that also in the case of the alloy magnetic powder, the surface roughness of the back coating layer was improved. Accordingly, the electromagnetic conversion characteristics were improved, and by virtue of the tough back coating layer, no adhesion to the guide poles took place, and no scars formed by the abrupt stopping of the running tape. In the case of an alloy tape, even fine dropouts are problematic, and it is very important that the coating layer is tough and free from abrasion, and dropouts are minimum.

Then, the surface roughness of the video tapes obtained by the above combination of the magnetic layer 4 and the back coating layer 2 was studied. FIG. 1 shows the S/N ratios (relative values) in the case where the video tapes were driven at a speed of 3.8 m/sec, and the recording and reproduction were conducted with a major frequency of 5 MHz. The numerical values allotted to the curves indicate the surface roughness of the magnetic layer. As is evident from the Figure, the S/N ratio can be kept at a high level when the surface roughness of the magnetic layer is at most 0.08 μm, and the surface roughness of the back coating layer is at most 0.6 μm. Similar results were obtained in the case of other combinations.

The relation between the BET specific surface area of the alloy powder and the S/N ratio was investigated with respect to the above video tapes wherein the surface roughness of the magnetic layer was at most 0.08 μm and the surface roughness of the back coating layer was within a range of from 0.05 to 0.6 μm, whereby the results as shown in FIG. 2 were obtained. However, 55 dB was employed as the reference. From FIG. 2, it is apparent that excellent characteristics are obtainable when the BET value is at least 48 m²/g. Similar results were obtained in the case of other combinations.

Further, the tightening of the tape winding was measured, and at 40° C. under a relative humidity of 80%, satisfactory results were obtained in all cases.

EXAMPLE 4

On one side of a polyethylene terephthalate base film having a thickness of 10 μm, a Co-Ni alloy (Hc: 1100 Oe) was vapour-deposited by vacuum deposition in an average thickness of 0.2 μm to form a thin magnetic layer.

Each of the back coating layers 1 and 2 of Examples 1 and 2 was applied, respectively, to the side of the substrate opposite to the side on which the magnetic recording layer composed of a thin metal film was thus formed, so that the dried thickness would be 1.0 μm, then dried and subjected to calender treatment for smoothing the surface. Then, thermosetting was conducted or electron beams were irradiated on the back coating layer by means of an electron curtain type electron beam accelerator at an acceleration voltage of 150 KeV, at an electrode current of 10 mA and at an absorption dosage of 3 Mrad in a nitrogen atmosphere to cure the back coating layer. Various characteristics of these magnetic tapes were tested, and the results are shown in Table 4. For the back coating layer 2, zinc sulfide (20 mμm) was used. As Comparative Examples, back coating layers wherein MgO and ZnO were used, respectively, as the pigment for the back coating layer 2, were employed.

From Table 4, it is evident that also in the case of the tapes obtained by vapour deposition of metal, the surface roughness and uniformity of the back coating layers were improved, whereby not only the electromagnetic conversion characteristics were improved but also the characteristics of ZnS were utilized to improve the running properties and to solve the problem of curling specific to metal vapour deposition tapes.

TABLE 4

| | Present Invention | | Comparative Examples | |
|---|---|---|---|---|
| | Back coating layer 1 | Back coating layer 2 | Back coating MgO | ZnO |
| Abrasion of the back coating layer | ◎ | ◎ | ◎ | ◎ |

TABLE 4-continued

|  | Present Invention | | Comparative Examples | |
| --- | --- | --- | --- | --- |
|  | Back coating layer 1 | Back coating layer 2 | Back coating layer MgO | ZnO |
| Surface roughness of the back coating layer ($\mu$m) | 0.06 | 0.06 | 0.12 | |
| Runs at 40° C. under RH of 80% | | | | |
| Winding appearance | Excellent | Excellent | Excellent | Poor |
| Image flickering | None | None | Substantial | Slight |
| Adhesion to the guide poles | None | None | Slight adhesion | Slight adhesion |
| Friction | | | | |
| Initial | 0.20 | 0.20 | 0.36 | 0.20 |
| After runs | 0.22 | 0.21 | 0.50 | 0.35 |
| Scars formed on the back coating surface by abrupt stopping | ◉ | ◉ | ◉ | ◉ |
| Electromagnetic conversion characteristics C-S/N dB | | | | |
| Outside | +0.7 | +0.7 | 0.0 | −1.5 |
| Inside | +0.7 | +0.7 | −0.3 | −1.5 |
| Curling | None | None | None | None |
| After storage at 60° C. at RH of 80% for 5 days | | | | |
| Winding appearance | Excellent | Excellent | No good | Poor |
| Image flickering | Excellent | Excellent | Substantial | Fair |
| Friction | 0.25 | 0.25 | Stop | 0.30 |

EXAMPLE 5

In the above back coating layer 2, x parts by weight of ZnS (50 m$\mu$m) and y parts by weight of carbon black (30 m$\mu$m) ($x+y=200$) were incorporated instead of ZnS. The characteristics of a magnetic tape prepared by the combination of the back coating layer thus obtained and the magnetic layer 2, are shown in Table 5. As Comparative Examples, a mixture of ZnO (0.5 $\mu$m) and carbon black, and a mixture of MgO (0.2 $\mu$m) and carbon black, were employed. The ratio of ZnO or MgO to carbon black was 140 parts by weight to 60 parts by weight.

From Table 5, it is evident that the incorporation of carbon black is effective in reducing dropouts. Further, it is evident that the ratio of ZnS/carbon black is preferably from 9/1 to 1/9, more preferably from 7/3 to 3/7.

Further, similar results are obtainable when an alloy magnetic layer or a ferromagnetic thin film is used for the combination.

The above-mentioned various characteristics were measured or evaluated as follows:

1. Abrasion of the back coating layer

By means of a commercially available VHS system VTR, a tape was permitted to run 100 times at 40° C. under a relative humidity of 60%, whereupon the scratches on the back coating surface were observed. Symbol ◉ indicates a very clean surface condition, symbol ○ indicates that no stain was observed, symbol Δ indicates that some stains were observed, and symbol x indicates that substantial stains were observed.

2. Dropouts

By using a VHS deck at 20° C. under a relative humidity of 60%, a single signal of 5 MHz was recorded and reproduced, whereby a number of samples wherein the reproduced signal lowers by at least 18 dB from the average reproduced level for at least 15 micro seconds, were counted with respect to 10 samples for 1 minute each, and the average number was taken as dropouts. The dropouts prior to the running test of the magnetic tape (initial) and the dropouts after 100 runs were measured.

3. Surface roughness

The surface roughness was obtained by 20 point average method from the chart obtained by means of Talystep (manufactured by TAYLOR-HOBSON CO.). A cut off of 0.17 mm and a needle-pressure of 0.1×2.5$\mu$ were employed.

4. Electromagnetic conversion characteristics

TABLE 5

| ZnS x | 200 | 180 | 140 | 100 | 60 | 20 | 0 | ZnO (140) | MgO (140) |
| --- | --- | --- | --- | --- | --- | --- | --- | --- | --- |
| Carbon y | 0 | 20 | 60 | 100 | 140 | 180 | 200 | 60 | 60 |
| Runs at 40° C. under RH 80% | | | | | | | | | |
| Abrasion of the back coating layer | ◉ | ◉ | ◉ | ◉ | ◉ | ◉ | Δ | Δ | Δ |
| Winding appearance | Excellent | Excellent | Excellent | Excellent | Excellent | Excellent | Poor | Poor | Poor |
| Image flickering | None | None | None | None | None | None | None | None–Slight | None–Slight |
| Adhesion to the guide poles | None | None | None | None | None | None | None | Slight | Slight |
| Friction | | | | | | | | | |
| Initial | 0.20 | 0.20 | 0.20 | 0.22 | 0.23 | 0.25 | 0.30 | 0.23 | 0.40 |
| After 100 runs | 0.18 | 0.18 | 0.18 | 0.20 | 0.24 | 0.26 | 0.32 | 0.28 | 0.45 |
| Dropouts | 150 | 90 | 50 | 50 | 40 | 40 | 40 | 200 | 300 |
| Electric resistance | $1 \times 10^{12}$ | $3 \times 10^{10}$ | $1 \times 10^{8}$ | $1 \times 10^{8}$ | $1 \times 10^{7}$ | $10^{7}$ or less | $10^{7}$ or less | $1 \times 10^{8}$ | $9 \times 10^{9}$ |

The recording and reproduction were conducted at a major frequency of 5 MHz and the S/N ratio (relative value) at the time of a departure by 0.7 MHz from 5 MHz was taken. The Comparative Example was used as the reference being 0 dB. A VTR of VHS was modified so that it was capable of measuring upto 5 MHz.

5. Electron microscopic method (a) The average particle size was measured by a transmission electron microscope by selecting a sample from each tape.

(b) A cross sectional photographic method by means of a scanning type electron microscope. In this case, it happens that particles are coagulated, and if the irregularity of the particle size is great, the minimum particle size is taken as an average particle size.

6. Frictional coefficient

A magnetic tape was put around a polished aluminum cylinder having a diameter of 4 mm at an angle of 180° C. so that the back coating layer is located inside, and permitted to run at a speed of 2 cm/sec, whereby the tensions at the dispensing side and at the winding-up side were measured, and the frictional coefficient was obtained by calculation from the measured values.

7. Scars on the back coating layer by abrupt stopping

Symbol ⊙ indicates that no scar was observed, symbol indicates that no substantial scar was observed, symbol Δ indicates that some scars were observed, and symbol X indicates that substantial scars were observed.

We claim:

1. A magnetic recording medium comprising a nonmagnetic substrate, a magnetic recording layer formed on one side of the substrate and a back coating layer formed on the entire length of the other side of the substrate, characterized in that the back coating layer is a coating layer comprising a particulate zinc compound consisting essentially of zinc sulfide having an average particle size of at most 0.2 μm and a resin binder.

2. The magnetic recording medium according to claim 1, wherein the magnetic recording layer is composed essentially of a ferromagnetic alloy powder dispersed in a resin binder and having a specific surface area of at least 48 m$^2$/g as measured by BET method, and has a coercive force of at least 1000 Oe and a surface roughness of at most 0.08 μm.

3. The magnetic recording medium according to claim 1, wherein the magnetic recording layer is a thin ferromagnetic film.

* * * * *